US009591271B2

(12) United States Patent
Dinis et al.

(10) Patent No.: US 9,591,271 B2
(45) Date of Patent: Mar. 7, 2017

(54) METHOD AND DEVICE FOR VIEWING COMPUTER DATA CONTENTS ASSOCIATED WITH PROPULSION

(76) Inventors: Alain Dinis, Bailly (FR); Antonio Dinis, Bailly (FR)

( * ) Notice: Subject to any disclaimer, the term of this patent is extended or adjusted under 35 U.S.C. 154(b) by 366 days.

(21) Appl. No.: 14/116,185

(22) PCT Filed: May 3, 2012

(86) PCT No.: PCT/FR2012/050977
§ 371 (c)(1),
(2), (4) Date: Dec. 24, 2013

(87) PCT Pub. No.: WO2012/153036
PCT Pub. Date: Nov. 15, 2012

(65) Prior Publication Data
US 2014/0098215 A1    Apr. 10, 2014

(30) Foreign Application Priority Data

May 10, 2011    (FR) ..................................... 11 54027

(51) Int. Cl.
| B63C 11/49 | (2006.01) |
| H04N 7/18 | (2006.01) |
| B63C 11/02 | (2006.01) |
| B63C 11/26 | (2006.01) |
| B63C 11/46 | (2006.01) |
| B63H 1/00 | (2006.01) |

(52) U.S. Cl.
CPC .............. *H04N 7/18* (2013.01); *B63C 11/02* (2013.01); *B63C 11/26* (2013.01); *B63C 11/46* (2013.01); *B63H 1/00* (2013.01); *B63C 2011/021* (2013.01)

(58) Field of Classification Search
USPC ..................................... 348/81, 113–115, 61
See application file for complete search history.

(56) References Cited

U.S. PATENT DOCUMENTS

| 4,192,001 A | 3/1980 | Villa |
| 5,469,803 A * | 11/1995 | Gallo ..................... A63B 35/12 |
| | | 114/315 |

(Continued)

FOREIGN PATENT DOCUMENTS

| EP | 1 434 187 | 6/2004 |
| EP | PT1434187 | 11/2008 |

(Continued)

OTHER PUBLICATIONS

International Search Report dated Sep. 12, 2012, corresponding to PCT/FR2012/050977.

*Primary Examiner* — Paulos M Natnael
(74) *Attorney, Agent, or Firm* — Young & Thompson

(57) ABSTRACT

A method and device for displaying computer content associated with a propulsion system, include: a standalone computer element (MO), the computer element including a display screen (4) in particular for displaying the computer content; a standalone propulsion element (PO) for moving an operator; an element for securing the computer element to the propulsion element; and an element for modifying the display of the computer content according to the movement of the operator, given that the movement of the operator takes place in a sub-aquatic environment.

21 Claims, 5 Drawing Sheets

(56) References Cited

U.S. PATENT DOCUMENTS

| | | | |
|---|---|---|---|
| 5,509,372 A | 4/1996 | Culotta | |
| 6,033,276 A * | 3/2000 | Han | B63C 11/46 114/315 |
| 6,317,387 B1 * | 11/2001 | D'Amaddio | G01N 29/11 114/222 |
| 6,360,182 B1 * | 3/2002 | Hales | A62B 18/08 128/201.27 |
| 6,524,145 B1 * | 2/2003 | Arzate | A63B 35/02 114/315 |
| 7,310,549 B1 * | 12/2007 | Angelini | B63C 11/02 482/3 |
| 7,331,833 B2 * | 2/2008 | Burgess, Jr. | A63C 17/267 180/180 |
| 7,347,158 B2 * | 3/2008 | Hawkes | B63C 11/46 114/312 |
| 7,699,017 B1 * | 4/2010 | Marshall | B63B 7/082 114/315 |
| 8,195,084 B2 * | 6/2012 | Xiao | B63C 11/02 434/4 |
| 9,060,102 B2 * | 6/2015 | Cook | H04N 7/185 |
| 2005/0174727 A1 | 8/2005 | Thomas et al. | |
| 2010/0309006 A1 * | 12/2010 | Barbaud | B63C 11/02 340/632 |
| 2012/0022820 A1 * | 1/2012 | Schmitz | G01C 21/165 702/95 |
| 2012/0262618 A1 * | 10/2012 | Weakly | A45C 11/00 348/333.01 |
| 2013/0187787 A1 * | 7/2013 | Damus | H04B 13/02 340/850 |

FOREIGN PATENT DOCUMENTS

| | | |
|---|---|---|
| FR | 2 864 288 | 6/2005 |
| FR | 2 914 196 | 10/2008 |

\* cited by examiner

Figure 9
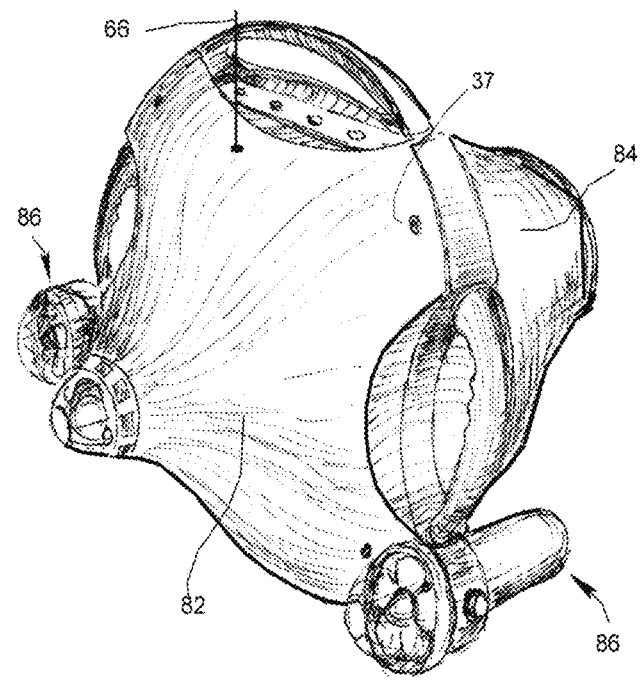
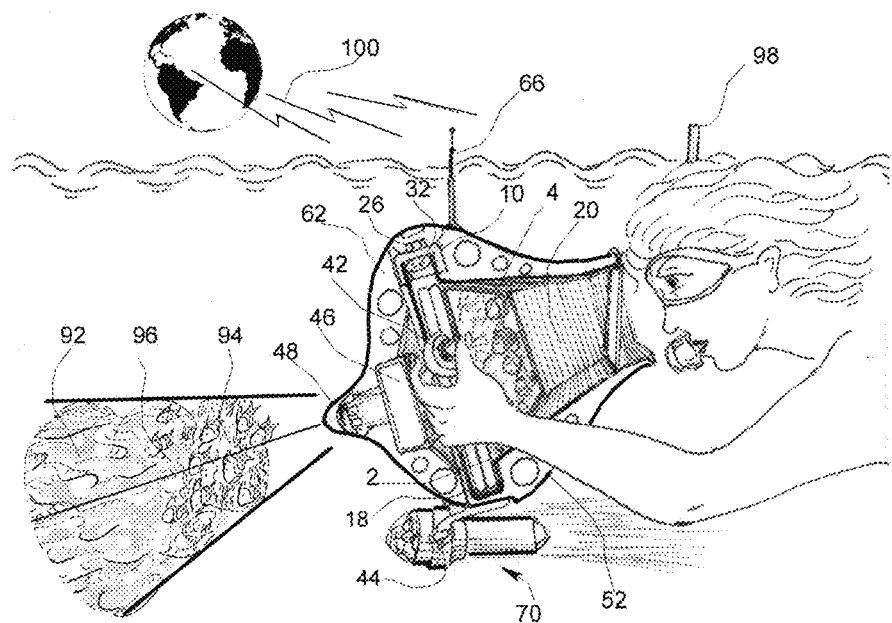
Figure 10

METHOD AND DEVICE FOR VIEWING COMPUTER DATA CONTENTS ASSOCIATED WITH PROPULSION

BACKGROUND OF THE INVENTION

The present invention relates to a method and a device for viewing computer data contents associated with a displacement of an operator.

This method notably applies to the broadcasting of multimedia and of underwater diving simulation comprising a convertible PC tablet in a sealed enclosure of small dimensions, which is propelled in a self-stabilized way; it thus allows broadcasting on and under water of diverse multimedia contents, such as those mobilizing 3D synthesis, virtual reality, augmented reality and mixed reality images, and multisensorial simulations, and this in interaction with the navigational conditions of the aforesaid sealed enclosure.

DESCRIPTION OF THE RELATED ART

Generally, it is known that convertible PC tablets like other similar portable computers presently available on the market are designed for being used out of the aquatic surroundings and currently include all the functionalities of personal computers. These tablets notably provide a quality of performances and a price level such that their generalization among general public users seems to be irreversible and forms an event which disrupts the use of personal computers. The dimensions of these tablets and their weight make them easy to use wherever are developed stationary or mobile general public activities, except for the aquatic environment, and notably in immersion.

For applications of tablets intended for a wet medium, more recent developments relate to waterproof casings for industrial applications of these devices which, while ensuring protection of the device against projected water, rain or ambient humidity, maintain tactile use of the screen, i.e. controls of the computer by the keys of the screen. Moreover, other devices are developed, such as air-inflatable waterproof transparent bags, in which the tablets are confined and which allow them to be used under water.

The devices available on the market for utilizing convertible PC tablets in the aquatic environment in immersion are essentially designed for the same current uses out of the water. Now, the use of computers in water, in particular in swimming pools and on beaches, requires characteristics and functionalities different from those for applications out of water.

None of these devices provide for these tablets, uses specific to the submersible aquatic medium. Also the devices are generally designed as sealed casings which can only be used with a specific tablet.

Several other limitations and drawbacks condition the use of existing technologies. Issues relating to the visibility of the images of the screen in water or to the exterior reflections on the screens are not treated. Further, the floatability of the devices placed in these enclosures is not taken into consideration and there is a risk of losing these devices during uses at sea. Aquatic activities for the general public, whether these are leisure, exploration or sport activities, require systems integrating computer, electronic hardware, multimedia contents and dedicated software packages. These devices and systems do not yet exist and the question is thus posed of how to meet this technical need by adapting, improving and completing existing technologies, in particular that of convertible PC tablets.

Finally aquatic activities require a certain degree of mobility and ideally assistance in the displacements on or under water which of course personal computers do not provide.

Moreover, the present invention is aimed at widening and at updating the field of application of the devices covered by the four following patents:
1. « Underwater diving simulator », National Registration No. 0216695 and Publication No. 2 846 390, by Alain Dinis.
2. « Amphibious multimedia system », National Registration No. 0315118 and Publication No. 2 864 288, by Alain Dinis.
3. « Mobile multimedia marine device » Patent Application 0702156 as of 26 Mar. 2007 by Alain Dinis and Antonio Dinis.
4. European Patent No. 1 434 187 granted on 6 Aug. 2008 to Alain Dinis.

These patents relating to novel information and communication technologies, describe a device associating a submersible computerized apparatus for broadcasting multimedia and for simulating underwater diving. This device broadcasts on and under water, diverse multimedia contents, such as those mobilizing 3D synthesis, virtual reality, augmented reality and mixed reality images and multisensorial simulations. The patents mentioned in 1, 2 and 4 relate to devices mainly designed for swimming pools. The invention mentioned in 3, more specifically relates to a device designed for beaches.

SUMMARY OF THE INVENTION

The present invention aims at filling the gaps of existing devices relating to the use of convertible PC tablets in aquatic media in general. It has the goal of providing all who practice immersion or surface aquatic activities in swimming pools, on beaches and in the sea, comprising sports activities such as sailing, or recreational boating, with the use of their PC tablets during these activities, not only with the functionality specific to these tablets but additionally, with functionalities meeting the specific requirements of the aquatic activities. The object thereof is notably to facilitate integration of all those who practice these aquatic activities into the overall Internet network to which they do not generally have access for the moment and to thus encourage the creation of multimedia contents adapted to these activities mobilizing 3D images, virtual and augmented reality and video games in immersion.

The object of the invention is a method for viewing a computer data content associated with displacement of an operator comprising the provision:
  of self-contained computer means, said computer means comprise a viewing screen notably for displaying said computer data content,
  of self-contained propulsion means for the displacement of an operator,
  of means for making said computer means integral with said propulsion means,
  means for modifying the display of said computer data content depending on said displacement of the operator,
while being aware that the aforesaid displacement of the operator is performed in a sub-aquatic medium.

In a more specific way, the interaction between the computer data content in a 3D environment and the positioning in the sub-aquatic space of said sealed enclosure is achieved from sensors such as a three-axis gyroscope; the initial positioning of the sealed enclosure at the surface, prior to diving, is ensured by a device such as a GPS.

Advantageously, the device for applying the method according to the invention may be equipped with a Wi-Fi link to the Internet network, allowing access to all the information which the convertible PC tablet would have broadcast to the ground.

Advantageously, said device may be equipped with a video camera and LED illumination giving the possibility of taking video shots of the sea bottom; it may also be equipped with sensors measuring the parameters defining the sub-aquatic surroundings, such as the temperature of the water, its purity, its salinity, the force of the current.

Advantageously, it may comprise a sonar with which data on the sea bottom may be sensed and a device carrying out bathymetric surveys of sea coasts.

Thus, the different instruments and peripherals integrated into said sealed electronic casing or associated with said sealed electronic casing considerably widen the functions provided by said convertible PC tablet and makes its utilization in the sub-aquatic environment safer and more diversified.

The device for applying the method according to the invention is designed in order to allow the general public who in particular go to beaches and swimming pools, to develop new activities and to transform the activities already practiced.

Advantageously, it will also comprise a multimedia system of interactive content dedicated to aquatic activities and in immersion which cover discovery, exploration, education, immersive therapy and relaxation. It should also be noted that the device is designed in order to allow development of aquatic and sub-aquatic activities in a network, wherever Internet is accessible. By integration of dedicated contents, the method according to the invention is a means for broadcasting multimedia supporting and enriching various aquatic activities, on the surface or in immersion, such as:
  swimming, the device being used for taking videos of swimmers in real time and allowing them to compare their technique with that of their instructor, immediately after practice and in situ.
  submersible sub-aquatic snorkeling with a snorkel, the contents of the device allowing simulation of the environment of underwater sites and discovery of their fauna and flora, exploration of actual or fictitious wrecks.
  relaxation, aquaphoby and aquatherapy which may be enhanced by multisensorial multimedia.
  aquafitness and the practice of aquatic sports in immersion with sensors which record the body data, the distance covered, the displacement speed, etc.
  underwater diving, the applications of which mobilizing simulation and virtual reality give the possibility of making its practice much safer.
  recreational and competitive navigation applying small craft such as sailing boats, pneumatic boats, kayaks. The device and access to Internet would reinforce the safety and the richness of these activities.

The invention thus aims at providing the general public practicing these activities, with novel educational methods having continuous access to information via the Internet, orientation by means of GPS and access to navigational aid mapping data.

BRIEF DESCRIPTION OF THE DRAWING FIGURES

An embodiment of the method according to the invention will be described hereafter, as a non-limiting example, with reference to the appended drawings wherein.

Figure 6:
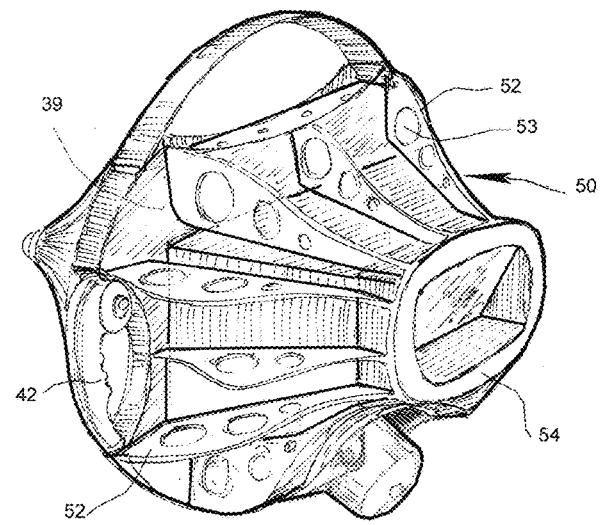
Figure 7:
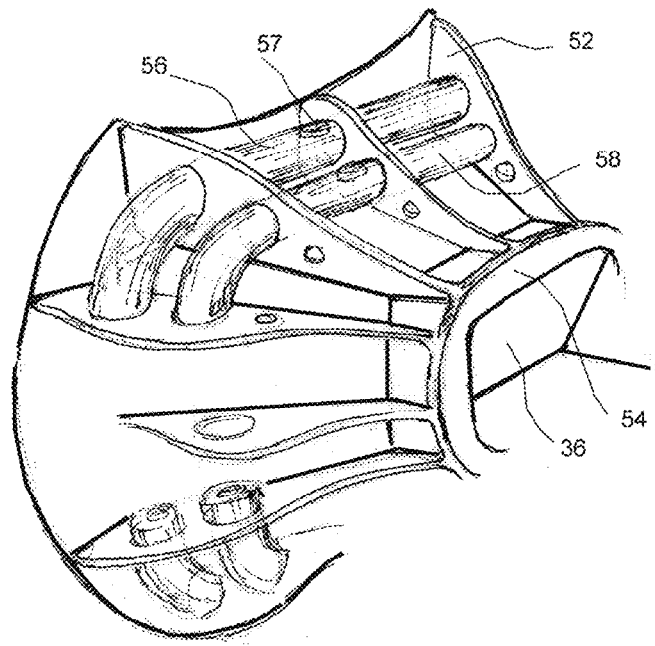
Figure 8:
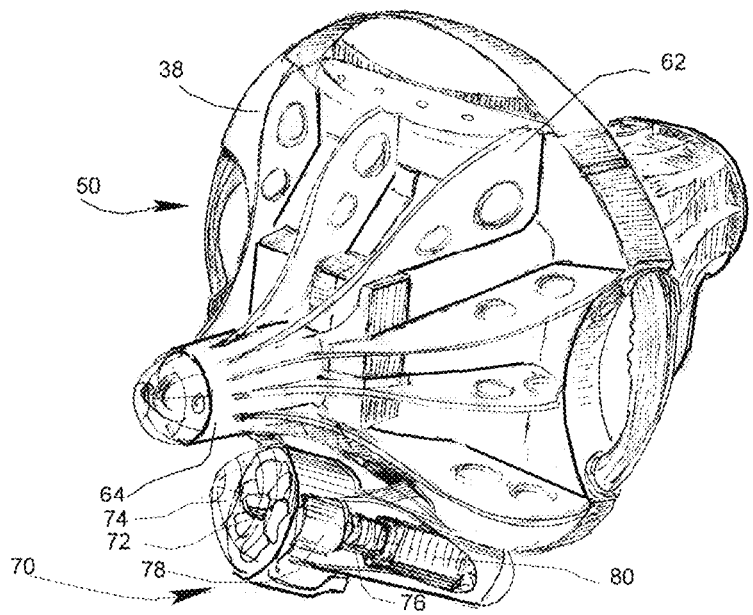

FIG. 6 illustrates the sealed enclosure associated with open-worked fins on the user side, FIG. 7 illustrates the device for adjusting the floatation of the sealed enclosure, FIG. 8 illustrates the sealed enclosure associated with open-worked fins on the opposite side, FIG. 9 illustrates the device according to the invention equipped with fairing and two propelling units, and FIG. 10 illustrates the device according to the invention according to a preferred method of use.

DETAILED DESCRIPTION OF THE INVENTION

Figure 1:
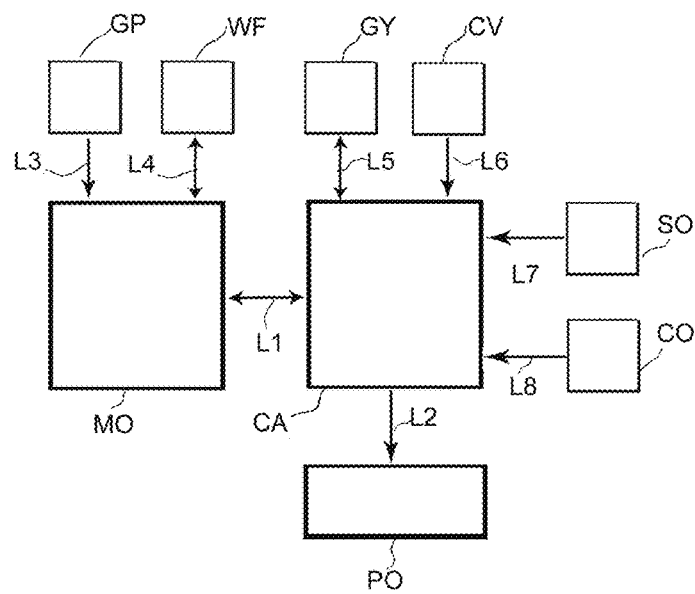
FIG. 1 is a schematic illustration of the method according to the invention.

In the example illustrated in FIG. 1, the schematic illustration of the different functionalities shows the composition of the latter and their respective different relationships, i.e.:
  A microcomputer MO,
  A computer CA in a bidirectional link L1 with the microcomputer MO,
  A propulsion device PO in a monodirectional link L2 with the computer CA,
  A GPS receiver GP in a monodirectional link L3 with the microcomputer MO,
  A Wi-Fi receiver WF in a bidirectional link L4 with the microcomputer MO,
  A three-axis gyroscope GY in a bidirectional link L5 with the computer CA,
  A video camera CV in a monodirectional link L6 with the computer CA,
  A sonar SO in a monodirectional link L7 with the computer CA, and
  A set of sensors CO in a monodirectional link L8 with the computer CA.

The microcomputer MO is in a direct link with the GPS receiver GP and the Wi-Fi receiver WF, respectively via the links L3 and L4, on the one hand and in a direct link with the computer CA via the link L1 on the other hand.

The GPS receiver GP thus gives the possibility of knowing the geographical position, the latter of course being in an emerged situation; the information provided by the GPS receiver GP is directly accessible on the screen of the microcomputer MO.

The Wi-Fi receiver WF allows connection, not shown, with the Internet network, and thus allows access to all the information available on the Internet network.

The association of both of these functionalities, described above, notably allows access to mapping data of a navigational aid.

The computer CA is linked via L5 with the three-axis gyroscope GY on the one hand and linked via L2 with the propulsion device PO on the other hand; thus the computer CA takes into account pieces of information transmitted by the three-axis gyroscope GY for transmitting them to the propulsion device PO, so as to correct the positioning in the sub-aquatic space relatively to the initial reference plane.

The computer CA also transmits the video images stemming from the camera CV, via the link L6, as well as the ultrasonic images stemming from the sonar SO, via the link L7.

Moreover, the information stemming from the three-axis gyroscope GY is taken into account by the computer CA so as to modify perception of the relevant multimedia content mobilizing 3D synthesis images, by associating the video images stemming from the camera CV and/or the ultrasonic images stemming from the sonar SO.

More specifically, the display of the multimedia content moves in an orthonormal trihedron reference system Oxyz, in the following way:

translation along the axes Ox, Oy, Oz, and
rotations around the axes Ox, Oz, being aware that the aforesaid orthonormal trihedron reference system comprises a horizontal plane containing the axes Ox, Oy, a vertical plane containing the axes Ox, Oz, the vertical plane being parallel to the viewing screen of the microcomputer MO.

On the other hand, the information transmitted by the set of sensors CO, via the link L8 to the computer CA, is processed by the latter so as to be utilized by the microcomputer MO; these pieces of information may thus relate to the temperature of the water, the cloudiness of the latter, the value of the pH, the speed of the current, the navigation depth; these pieces of information may also relate to the operator, i.e. body temperature, heartbeats, arterial pressure; this processing may simply result in the display of the numerical values stemming from the sensors; advantageously, this processing may also allow multisensorial simulations in interaction with the navigation conditions.

Figure 2:
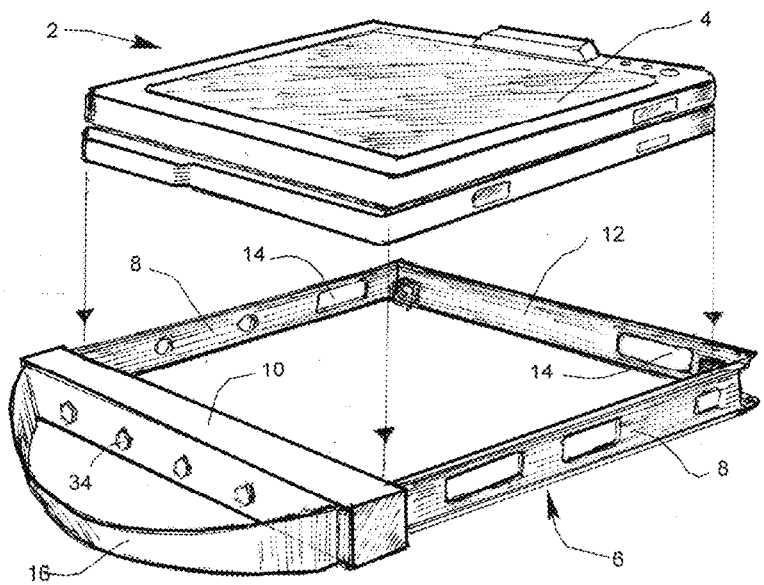
FIG. 2 illustrates the implementation of a convertible PC tablet in a drawer.

In the example illustrated in FIG. 2, a convertible PC tablet 2, the screen 4 of which is rotated and folded back onto the keyboard, thereby leaving said screen visible above. Under the convertible PC tablet, a drawer 6 formed with two lateral slides 8 connected through a cover 10 and through an abutment 12 forms a rigid frame. The free space between these elements specifically corresponds to the outer dimensions of the convertible PC tablet which will be attached therein. The slides and the abutment comprise apertures 14 which allow connections to be made between the convertible PC tablet and the peripherals, on the one hand and with the electronic casing on the other hand. The handle of the device 16 will be attached on the cover of the drawer.

Figure 3:
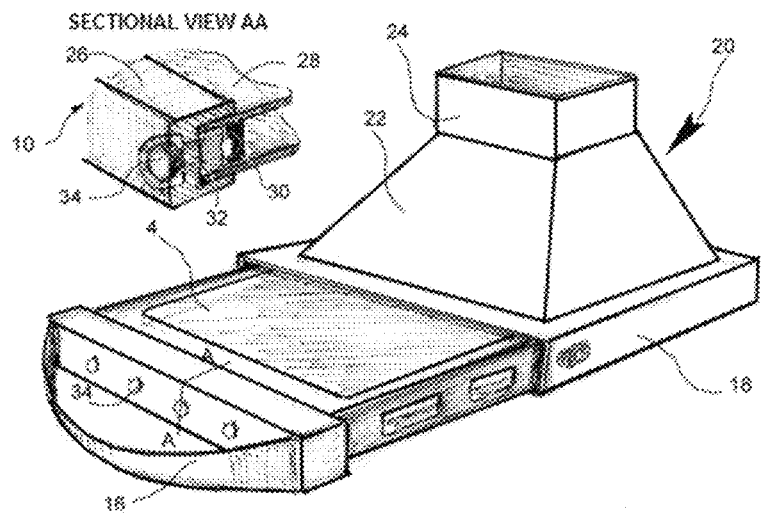
FIG. 3 illustrates the implementation of the drawer in a sealed enclosure.

In the example illustrated in FIG. 3, the convertible PC tablet placed in the drawer before closing the cell 18 which is one of the portions of the sealed enclosure 20, further comprises the dark room 22 and the porthole 24. This figure also illustrates the detail of the cross-section of the sealed cover 10. A part 26, the section of which is U-shaped and which will cover the free edges 28 of the cell 18, the clamping plate between these edges 30 and the strip in a flexible elastic material 32 placed between this plate and the part 26 with the U-section. Tightening the bolt 34 by squeezing this strip, pushes it against the walls of the cell and ensures its sealing. These walls will abut against the sides of the cover which then becomes integral with the cell.

Figure 4:
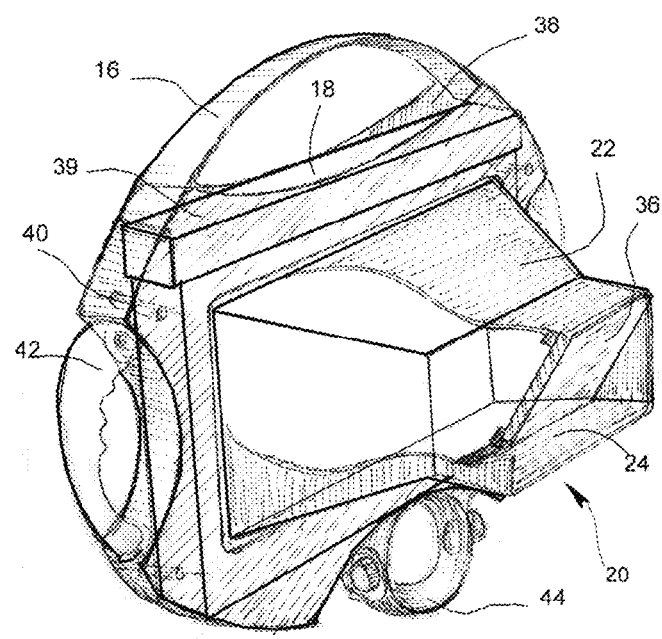
FIG. 4 illustrates the sealed enclosure from the user's side.

In the example illustrated in FIG. 4, the sealed enclosure 20 is shown on the user side with its three compartments: the cell of the tablet 18, the dark room 22 as well as the porthole 24 where the tilted anti-reflective glass plate 36 will be sealed in a waterproof way. Moreover, it has both frames 38 and 39 of the fairing which sandwich the cell 18 of the convertible PC tablet with the bolts 40 and forms the support of the two joysticks 42 and of the flange 44 for attaching the propelling unit.

Figure 5:
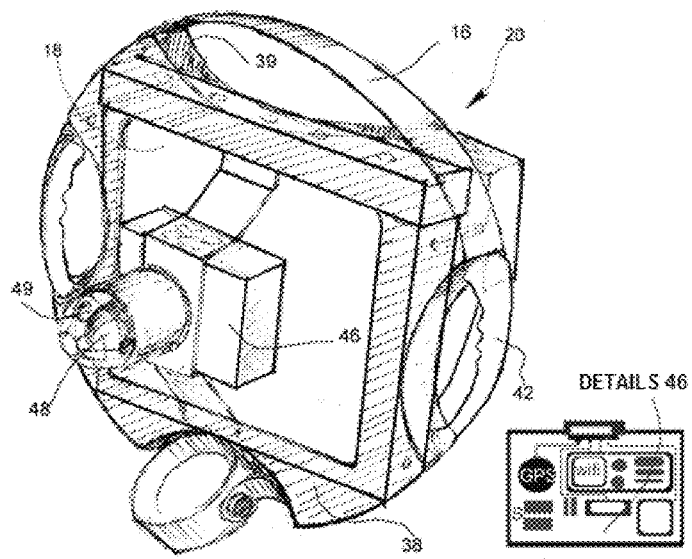
FIG. 5 illustrates the sealed enclosure from the opposite side.

In the example illustrated in FIG. 5, the sealed enclosure 20 is shown on the front side and shows the position of the electronic casing 46, of the video camera 48 and of its LED back-illumination 49; it thus gives the view of both frames 38, 39 of the fairing on each side of the cell of the convertible PC tablet and on the principle of structuration between the different elements of the device.

In the example illustrated in FIG. 6, an overall view of the device from the user side is shown with as an example one of the options of the fairing 50: open-worked fins 52, placed around the dark room 22 and securing the frame 39 with the framing of the porthole 54 in order to form a rigid assembly separated from the sealed enclosure. A sealed cylinder 56 of the propelling unit in the alternative of a single propelling unit placed below and in the axis of the device.

In the example illustrated in FIG. 7, the principle of the method provided for adjusting the floatation level of the device is shown. Tubes 56, 58 are housed in circular recesses 53 of the fins and form air pockets which condition the floating position of the device at the surface of the water. This is the position by default. If the user wishes to place himself/herself underwater and use his/her snorkel, he/she does it by filling these tubes with water through the opening of the filling valves 57. A mini-pump ensures emptying of the tubes for returning to floating on the surface.

In the example illustrated in FIG. 8, an overall view of the device on the front side is shown, with one of the options of the fairing with open-worked fins. These fins are attached on the frame 38 of one end and on a tube 64 placed around the video camera, on the other end, in order to form a rigid cage around the electronic case 46. A detail of this electronic casing schematically indicates the installed components: GPS, Wi-Fi, gyroscope, tilt sensor, accelerometer, diverse sensors. The extensible antenna 66 is attached to this structure and allows Internet connection when the device is under water, a non-negligible portion of this antenna having emerged. In the lower portion the propelling unit 70 will be housed in the case when the device would only comprise a single propelling unit. This propelling unit which is attached to the fairing, comprises the propeller 72 protected by a grid 74, the electric motor 76, the variator 78 and the battery 80 in the sealed cylinder 56.

In the example illustrated in FIG. 9, a preferred alternative is shown for the fairing with two half-shells, a front 82 and rear 84 half-shell in plastic which will be attached on the frames 38 and 39 with the tightening bolts 37. Also, another preferred alternative for making the device consists of equipping it with two propelling units 86, placed on each side of the device.

In the example illustrated in FIG. 10, an example of one of the preferred embodiments of the device in immersion and with the use of a snorkel 98 is shown, the extensible antenna 66 remaining alone out of the water and ensuring connection with the Internet network 100. The operator by actuating the levers 42 selects one of the available contents for example mobilizing augmented virtual reality. Through the front video camera 48, he/she sees the actual images 92 of the sea bottom over which he/she moves. In general, in the majority of beaches, these images are of no interest. By mobilizing animated virtual 3D images 94 from a data base which is accessible on-line, for example of tropical fish and by mixing them with the 2D images of these bottoms, the resulting augmented reality images there from 96 on its screen 4, form one of the innovating results of the device.

The user having a convertible PC tablet and wishing to use it on or under water for accessing multimedia programs available online, proceeds in the following way:

1—The integration of the tablet into the apparatus is achieved by unscrewing the bolts of the cover which is then freed from the sealed enclosure. Attached to the cover, there is a frame in which the tablet is placed, which attaches thereto, with the screen turned towards the front and the power supply connections and other ones. The tablet is then introduced into the cell which the cover will close. Tightening the bolts makes the cover integral with the enclosure and ensures the seal of the assembly.

2—The user then has the choice of using the apparatus either without the propulsion module or with this module.

If the use without the propulsion module is selected, the only preparation which remains to be done is to adjust the ballasting of the apparatus for using it on water or under water, with a snorkel.

If the use with the propulsion module is selected, he/she should attach this module to the apparatus by using both of the fast attachments provided. The assembly is then ready to be placed in water.

3—Once set in water, the controls of the computer are performed by means of two levers placed on each side of the apparatus. These levers may also control propulsion.

The device has the main following features:

It is mobile: this mobility is not conditioned at the surface of the water or in immersion with a snorkel.

It is autonomous: this autonomy is limited by the capacity of the batteries of the device; in a swimming pool, by supplying power to it through an unwinding cable under 18 volts, this limitation is removed.

It is self-propelled: by adding an optional module of the device, the user is assisted in his/her displacements on or under water.

It is easily carried by a person; the device is modular and may be transported in its entirety or in two modules.

In water, it remains naturally floating; the goal is to ensure that it cannot sink and therefore not be lost on the one hand and that it positively participates in the floating of its user on the other hand.

For immersing it, it has to be ballasted; this ballast is necessary for its use underwater with a snorkel or without any breathing apparatus; by filling with water a tubular installation integrated with the fairing, the required ballast is ensured; by emptying the water tubes, the device again finds its initial floatation; the device therefore has variable floatation.

It is connectable to Internet and to the GPS network; as it has an extensible antenna, the device may be used in swimming pools and on the seaside, where access to Internet will gradually be generalized.

It is equipped with many sensors, the measurements of which in real time give the possibility of defining the parameters of the immediate environment and the body data of the user; the goal is to provide the users with safety and reliability conditions during aquatic activities which no other system presently provides.

The invention claimed is:

1. A connected, submersible, mobile and computerized device that associates and displays multimedia 2D and 3D contents with displacement of an operator, the device comprising:
    a convertible computer PC tablet (MO) equipped with a viewing screen (4) for displaying said multimedia 2D and 3D contents, the viewing screen (4) being viewable by the operator while the operator and the device are underwater;
    a frame that contains the PC tablet (MO);
    self-contained propulsion units (PO) integrated with the frame, the self-contained propulsion units (PO) providing displacement of the operator at water surface;
    instruments that integrate operation of said PC tablet (MO) with said propulsion units (PO), wherein said PC tablet (MO) operates software modifying the display of data contents of said PC tablet (MO) according to the displacement of the operator within the water; and
    an antenna connected to the PC tablet (MO) and connecting the PC tablet, via a wireless link, to the Internet, wherein via the wireless link the PC Tablet (MO) has reception from the Internet of the 2D and 3D multimedia contents and transmission to the Internet, wherein the received, and subsequently displayed, multimedia 2D and 3D contents is associated with the propulsion units' (PO) displacement of the operator.

2. The device according to claim 1, wherein the display of the computer data contents is displaced in an orthonormal trihedron reference system Oxyz.

3. The device of claim 1, further comprising:
    a WiFi antenna connected to the PC tablet; and
    a video camera attached to the frame, the camera operative for taking real time video images of sea depths, the PC tablet operative mixed the real time video images with virtual images received from the Internet through the WiFi antenna to generate augmented reality contents.

4. The device according to claim 3, wherein the frame is comprised of a water-sealed enclosure that contains the PC table (MO), instruments for connecting with the Internet (WF), and equipment for satellite geostationary positioning (GP).

5. The device according to claim 3, further comprising:
    a set of sensors (CO) provided for delivering information including at least one from the group consisting of temperature of the water, cloudiness of the water, a value of the acidity of the water, a current speed, a navigational depth.

6. The device according to claim 3, further comprising:
    joysticks; and
    a set of sensors (CO) installed in the joysticks and provided for delivering information including at least one from the group consisting of operator body temperature, operator heartbeats, and operator arterial pressure.

7. The device according to claim 1, wherein each propelling unit (70) comprises a tubular cylinder (72), a propeller (74) protected by a grid (75), a variator (78), a DC motor (76), and a dedicated rechargeable battery (80).

8. A method of displaying multimedia 2D and 3D contents based on associating displacement of an operator, the method comprising the steps of:
    an the operator snorkeling at water surface holding an Internet connected, submersible, mobile and computerized device below the water surface, the device comprising a convertible computer PC tablet (MO)

equipped with a viewing screen (4) for displaying said multimedia 2D and 3D contents, a frame that contains the PC tablet (MO), and self-contained propulsion units (PO) integrated with the frame, instruments that integrate operation of the PC tablet (MO) with the propulsion units (PO), wherein said PC tablet (MO) operates software modifying the display of data contents of said PC tablet (MO) according to the displacement of the operator within the water, the PC tablet (MO) being wirelessly linked to the Internet, wherein via the wireless link the PC Tablet (MO) has reception from the Internet of the 2D and 3D multimedia contents and transmission to the Internet;

the operator viewing the viewing screen (4) while the operator is snorkeling at the water level and the PC tablet (MO) is underwater;

the self-contained propulsion units (PO) providing displacement of the operator under the water; and the software modifying the display of data contents of said PC tablet (MO) according to the displacement of the operator within the water, wherein via the wireless link the PC Tablet (MO) receives from the Internet the 2D and 3D multimedia contents and transmits to the Internet, and the received multimedia 2D and 3D contents is displayed on the viewing screen (4) in association with the propulsion units' (PO) displacement of the operator.

9. The method according to claim 8, wherein use of an extensible antenna that remains above the water surface during the operator snorkeling provides a WiFi link that the Internet, and at least one portion of the computer data contents is downloaded by from the Internet via the WiFi link.

10. The method according to claim 8, wherein the display of the computer data contents is displaced in an orthonormal trihedron reference system Oxyz.

11. The method according to claim 10, wherein the orthonormal trihedron reference system Oxyz comprises a horizontal plane containing the axes Ox, Oy, a vertical plane containing the axes Ox, Oz, said vertical plane being parallel to the aforesaid viewing screen (4).

12. The method according to claim 11, wherein the computer data contents is displaced in translation along the axes Ox, Oy and Oz and in rotation about the axes Ox and Oz.

13. The method according to claim 8, wherein operation of the self-contained propulsion means (MO) is conditioned by the software of the PC tablet (MO).

14. The method according to claim 13, wherein the software of the PC tablet (MO) contributes to self-stabilization of the self-contained propulsion means (MO).

15. The method according to claim 8, wherein the software of the PC tablet (MO) uses data stemming from the satellite geostationary positioning means (GP) in position determining of the PC tablet (MO).

16. A device for viewing a computer data content associated with a displacement of an operator, said device comprising:

self-contained propulsion units to provide displacement of an operator at water surface;

a convertible computer PC tablet (MO) equipped with a viewing screen (4) for displaying multimedia 2D and 3D computer data contents, the viewing screen (4) being viewable by the operator while the operator and the device are underwater, the convertible computer PC tablet (MO) is made integral with said propulsion units, said viewing screen (4) notably displaying said computer data contents;

modifying unit modifying the display of said computer data content according to said displacement of the operator;

a sealed enclosure (20); and instruments for connecting with the Internet (WF) and equipment for satellite geostationary positioning (GP) connected to the PC tablet (MO), and contained in said sealed enclosure (20).

17. The device according to claim 16, wherein said sealed enclosure (20) comprises a dark room (22) placed in front of the screen of the PC tablet (MO), said dark chamber (22) being closed by a sealed porthole (24) comprising an anti-reflective tilted glass plate (36).

18. The device according to claim 16, further comprising a fairing (50) for protecting the sealed enclosure (20) and a rectangular cell (18) closed by a cover (10), said cover comprising a handle (16) and ensuring the seal of said sealed enclosure (20).

19. The device according to claim 18, characterized in that said fairing (50) comprises fins (52, 62) ensuring protection of said sealed enclosure (20).

20. The device according to claim 19, characterized in that the fins (52, 62) comprise circular reservations (53) crossed by tubular ballasts (56, 58), the filling with water of which allows adjustment of the floating level.

21. The device according to claim 18, wherein said fairing (50) comprises two retractable front (82) and rear (84) sections, attached together with frames (38, 39) by means of bolts (37, 40), said sections (82, 84) may be replaced with other types of fairing without modifying said sealed enclosure (20).

* * * * *